United States Patent
Border et al.

(10) Patent No.: US 8,130,278 B2
(45) Date of Patent: Mar. 6, 2012

(54) METHOD FOR FORMING AN IMPROVED IMAGE USING IMAGES WITH DIFFERENT RESOLUTIONS

(75) Inventors: John N. Border, Walworth, NY (US); Amy D. Enge, Spencerport, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 559 days.

(21) Appl. No.: 12/184,446

(22) Filed: Aug. 1, 2008

(65) Prior Publication Data

US 2010/0026839 A1    Feb. 4, 2010

(51) Int. Cl.
*H04N 5/225* (2006.01)
*G06K 9/36* (2006.01)

(52) U.S. Cl. ............. 348/208.6; 348/208.15; 348/208.2; 348/208.13; 382/236

(58) Field of Classification Search .. 348/208.1–208.13, 348/239; 382/236
See application file for complete search history.

(56) References Cited

U.S. PATENT DOCUMENTS 4,296,436 A    10/1981   Achiha
5,325,449 A    6/1994    Burt et al.
(Continued)

FOREIGN PATENT DOCUMENTS

EP    1 501 288 A2    1/2005
(Continued)

OTHER PUBLICATIONS

Hamilton et al., Multiple Component Read Out of Image Sensor, U.S. Appl. No. 11/780,523.

(Continued)

*Primary Examiner* — Tuan Ho
*Assistant Examiner* — Selam Gebriel
(74) *Attorney, Agent, or Firm* — Blakely Sokoloff Taylor & Zafman LLP

(57) ABSTRACT

Multiple images of a scene are acquired over a contemporaneous period of time. Most of the multiple images are lower resolution images acquired with a lower resolution than the other of the multiple images. A corrected set of images is formed at least by correcting for motion present between at least some of the lower resolution images. In addition, a synthesized image is formed at least by merging (a) at least a portion of at least one of the images in the corrected set of images, and (b) at least a portion of at least one of the other of the multiple images. The synthesized image is stored in a processor-accessible memory system. The synthesized image exhibits improved image quality including reduced motion blur, a higher signal-to-noise ratio, and higher resolution over conventional techniques.

21 Claims, 6 Drawing Sheets

U.S. PATENT DOCUMENTS

| | | | |
|---|---|---|---|
| 5,442,407 A | 8/1995 | Iu | |
| 5,488,674 A | 1/1996 | Burt et al. | |
| 5,600,731 A | 2/1997 | Sezan et al. | |
| 5,657,402 A | 8/1997 | Bender et al. | |
| 5,696,848 A * | 12/1997 | Patti et al. | 382/254 |
| 5,754,692 A * | 5/1998 | Kondo et al. | 382/216 |
| 5,777,756 A | 7/1998 | Hidari | |
| 5,920,657 A | 7/1999 | Bender et al. | |
| 6,115,502 A | 9/2000 | De Haan et al. | |
| 6,281,942 B1 | 8/2001 | Wang | |
| 6,519,288 B1 | 2/2003 | Vetro et al. | |
| 6,650,704 B1 | 11/2003 | Carlson et al. | |
| 7,061,524 B2 | 6/2006 | Liu et al. | |
| 7,064,779 B1 | 6/2006 | Pine | |
| 7,084,910 B2 | 8/2006 | Amerson et al. | |
| 7,092,019 B1 | 8/2006 | Ogata et al. | |
| 7,619,656 B2 * | 11/2009 | Ben-Ezra et al. | 348/208.4 |
| 2001/0021224 A1 | 9/2001 | Larkin et al. | |
| 2003/0063814 A1 | 4/2003 | Herley | |
| 2003/0213892 A1 | 11/2003 | Zhao et al. | |
| 2004/0179108 A1 | 9/2004 | Sorek et al. | |
| 2004/0196376 A1 * | 10/2004 | Hosoda et al. | 348/207.1 |
| 2005/0013509 A1 | 1/2005 | Samadani | |
| 2005/0157949 A1 | 7/2005 | Aiso et al. | |
| 2005/0163402 A1 * | 7/2005 | Aiso | 382/300 |
| 2006/0017837 A1 | 1/2006 | Sorek et al. | |
| 2006/0062303 A1 * | 3/2006 | Xu | 375/240.16 |
| 2006/0082675 A1 | 4/2006 | McGarvey et al. | |
| 2006/0140507 A1 * | 6/2006 | Ohki | 382/276 |
| 2006/0152596 A1 | 7/2006 | Adams, Jr. et al. | |
| 2006/0239579 A1 | 10/2006 | Ritter | |
| 2007/0024931 A1 | 2/2007 | Compton et al. | |
| 2007/0147820 A1 * | 6/2007 | Steinberg et al. | 396/155 |
| 2007/0189386 A1 * | 8/2007 | Imagawa et al. | 375/240.12 |
| 2007/0222864 A1 * | 9/2007 | Hiraga et al. | 348/208.4 |
| 2007/0242140 A1 * | 10/2007 | Kimura | 348/231.99 |
| 2008/0088711 A1 * | 4/2008 | Border et al. | 348/222.1 |
| 2008/0112612 A1 | 5/2008 | Adams et al. | |
| 2008/0166062 A1 * | 7/2008 | Adams et al. | 382/255 |
| 2008/0212892 A1 * | 9/2008 | Doida et al. | 382/274 |
| 2008/0292193 A1 * | 11/2008 | Bigioi et al. | 382/203 |
| 2008/0309778 A1 * | 12/2008 | Tabatabai et al. | 348/222.1 |
| 2008/0316328 A1 * | 12/2008 | Steinberg et al. | 348/222.1 |
| 2009/0002501 A1 * | 1/2009 | Silsby et al. | 348/208.16 |
| 2009/0002504 A1 * | 1/2009 | Yano et al. | 348/218.1 |
| 2009/0052788 A1 * | 2/2009 | Doida | 382/236 |
| 2009/0141810 A1 * | 6/2009 | Tabatabai et al. | 375/240.25 |
| 2009/0225200 A1 * | 9/2009 | Ohki | 348/241 |
| 2009/0279788 A1 * | 11/2009 | Murata et al. | 382/199 |
| 2010/0007754 A1 * | 1/2010 | Doida | 348/222.1 |
| 2010/0026825 A1 * | 2/2010 | Doida | 348/222.1 |
| 2010/0027661 A1 * | 2/2010 | Doida | 375/240.16 |
| 2010/0214422 A1 * | 8/2010 | Iwamura et al. | 348/208.4 |

FOREIGN PATENT DOCUMENTS

| | | |
|---|---|---|
| EP | 2 059 027 A1 | 5/2009 |
| GB | 2 373 946 A | 10/2002 |
| GB | 2 391 130 A | 1/2004 |
| WO | WO 2006/058191 A2 | 6/2006 |
| WO | WO 2006/063978 A1 | 6/2006 |
| WO | 2007/017835 | 2/2007 |

OTHER PUBLICATIONS

Yuan et al., Image deblurring with blurred/noisy image pairs.

Razligh, Kehtarnavaz, Image blur reduction for cell-phone cameras via adaptive tonal correction, 2007.

Raskar, Agrawal, Tumblin, Coded exposure photography: motion deblurring using fluttered shutter, 2006.

Stephan Pelletier et al.: "High-Resolution Video Synthesis from Mixed-Resolution Video Based on the Estimate-and-Correct Method", 2005 Seventh IEEE Workshops on Applications of Computer Vision (WACV/MOTION'05)—Jan. 5-7, 2005—Breckenridge, CO, USA, IEEE, Los Alamitos, California, USA, Jan. 1, 2005, pp. 172-177, XP031059086, ISBN: 978-0-7695-2271-5, the whole document.

PCT/US2009/004204; International Search Report and Written Opinion, mail date Sep. 30, 2009 (7 pages).

* cited by examiner

METHOD FOR FORMING AN IMPROVED IMAGE USING IMAGES WITH DIFFERENT RESOLUTIONS

FIELD OF THE INVENTION

The invention pertains to generating an improved image from multiple images. More specifically, multiple images are used to form an improved image having reduced motion blur and reduced noise.

BACKGROUND OF THE INVENTION

A problem to be addressed is light deficient photography in the presence of motion during image capture causing motion blur in the image. The motion can be of a global variety where the entire scene being imaged moves together or of a local variety where one or more portions of the scene move at a different speed or direction compared to the rest of the scene. Global motion is due to a relative motion between the scene and the camera during image capture. Local motion is due to objects within the scene moving relative to the other portions of the scene. Local motion can occur differently in different portions of the scene.

In the case where the exposure time is short and motion is slow, a single image capture can be used to capture an image with good image quality. However, as the exposure time required to get an image with a high signal-to-noise ratio becomes longer relative to the motion that is present during the image capture, or the available light decreases, captured image quality degrades in the form of increased motion blur and increased noise within the image.

For consumer digital cameras, there is a trend for the size of the pixels to get smaller over time, which decreases the available area to capture light during the exposure, so that noise becomes more of a problem. Exposure times can be increased to compensate for smaller pixels, but then motion blur becomes more of a problem. Consequently, methods to increase the sensitivity of pixels to light have been described as in U.S. patent application Ser. No. 11/191,729 by Hamilton which adds panchromatic pixels to the image sensor.

As the motion increases relative to the exposure time or the available light decreases there are a series of compromises that can be made. Several compromises can be made in photographic space to increase spatial resolution, temporal resolution or image quality, but, it is important to note that with each gain there will also be losses. For instance, the exposure time can be decreased to reduce motion blur thereby increasing temporal resolution, but at the expense of increasing noise in the image. Flash is an effective way to reduce noise in the image and by enabling a shorter exposure time, the temporal resolution is increased but at the expense of uneven lighting and redeye. Optically based image stabilization can be used during the exposure to enable a longer exposure time to reduce noise in the image while decreasing motion blur and increasing spatial resolution. However, optically based image stabilization can only be used to reduce motion blur from camera motion (global motion). The effective size of the pixels can be increased to enable a reduced exposure time by binning (i.e., adjacent pixels are connected to one another so the charge on the adjacent pixels is summed and the signal is increased). However, binning is accompanied by a decrease in spatial resolution. Multiple low-resolution video images can be used to form a single image with improved image quality while maintaining spatial resolution and offering a balance between temporal resolution and exposure time. Reading multiple images within a given time can reduce motion blur by using a shorter exposure time for each image, however, each image will be noisier. By aligning the multiple images with each other to correct for motion between individual image captures and then summing (stacking) the individual images together, the noise can be reduced in the formed single image.

While multiple low-resolution video images can be readout relatively quickly (30-60 images/sec is typical), and the images typically have lower noise since the pixels are often binned, the single image that can be formed is limited to relatively low resolution. Conversely, multiple high resolution images can be used to form a high resolution single image. However, high resolution images typically are noisier since the pixels are smaller, and more significantly, a relatively large amount of time is required to readout multiple high resolution images (1.5-7 images/sec is typical) due to hardware limitations. In addition, the problem of aligning the images grows large due to significant motion between the image captures.

Therefore, a need in the art exists for an improved solution to combining multiple images to form an improved image, especially in scenes where motion is present.

SUMMARY OF THE INVENTION

The above-described problems are addressed and a technical solution is achieved in the art by systems and methods for forming an image, according to various embodiments of the present invention. In some embodiments of the present invention, multiple images of a scene are acquired over a contemporaneous period of time, wherein most of the multiple images are lower resolution images acquired with a lower resolution than the other of the multiple images. At least some of the lower resolution images may be video images or preview images, and the lower resolution images may be acquired prior to acquisition of the other of the multiple images. In some embodiments, the lower resolution images have the same or longer exposure times than the other of the multiple images. In some embodiments, the other of the multiple images includes only a single higher-resolution image. A corrected set of images is formed at least by correcting for motion present between at least some of the lower resolution images. In addition, a synthesized image is formed at least by merging (a) at least a portion of at least one of the images in the corrected set of images, and (b) at least a portion of at least one of the other of the multiple images. Further, the synthesized image is stored in a processor-accessible memory system. The synthesized image exhibits improved image quality including reduced motion blur, a higher signal-to-noise ratio, and higher resolution over conventional techniques.

In some embodiments, the formation of the corrected set of images includes merging of the lower resolution images that were motion-corrected into a single lower-resolution image, wherein the corrected set of images includes only the single lower-resolution image. In some of these embodiments, the formation of a corrected set of images further includes aligning features within at least some of the lower resolution images to offset such images from one another, wherein the aligning occurs prior to the merging of the lower resolution images.

In some embodiments, the lower resolution images are saved in a rolling buffer. These embodiments help prevent the time for capturing the multiple lower resolution images from contributing to shutter lag.

In some embodiments, receipt of a partially-depressed-capture-button signal causes the acquisition of the lower resolution images, and receipt of a fully-depressed-capture-button signal causes the acquisition of the other of the multiple images.

In some embodiments, such as those where the lower resolution images are video images, audio data is acquired while acquiring the lower resolution images. In these cases, the audio data and the lower resolution images are stored in a processor-accessible memory system in a manner that links the audio data and the lower resolution images to the synthesized image. Such embodiments provide a video and audio context to go along with the synthesized image.

In addition to the embodiments described above, further embodiments will become apparent by reference to the drawings and by study of the following detailed description.

BRIEF DESCRIPTION OF THE FIGURES

The present invention will be more readily understood from the detailed description of exemplary embodiments presented below considered in conjunction with the attached drawings, of which.

Figure 1:
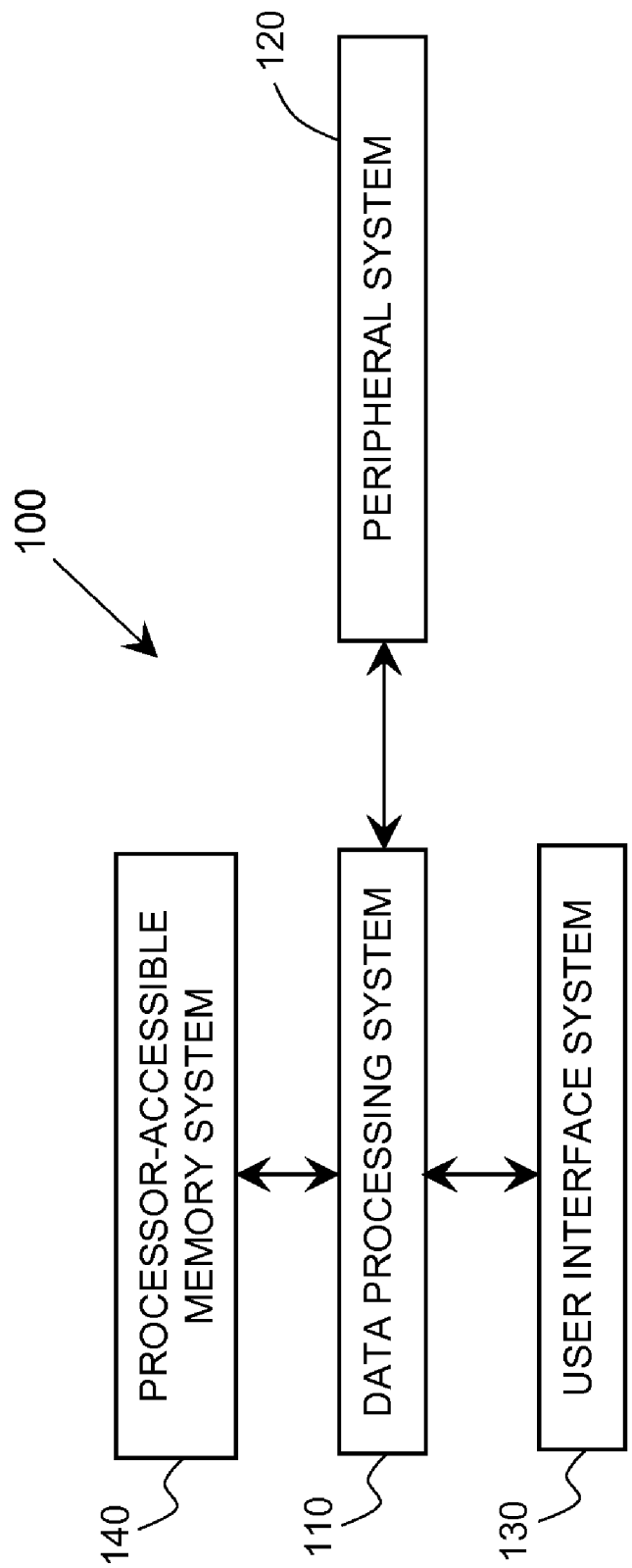
FIG. 1 illustrates a system for forming an image, according to an embodiment of the present invention.

It is to be understood that the attached drawings are for purposes of illustrating the concepts of the invention and may not be to scale.

DETAILED DESCRIPTION OF THE INVENTION

Embodiments of the invention pertain to acquiring or capturing multiple images of a scene, wherein the multiple images form a capture set composed of lower resolution images and a smaller number of higher resolution images. All of the images are acquired within a relatively short period of time so that they can be considered contemporaneous with one another. The lower resolution images have the same or longer exposure times and effectively bigger pixels due to binning on the sensor than the higher resolution images. Consequently, the lower resolution images have a higher signal-to-noise ratio, a lower resolution, and the same or more motion blur in each image. In contrast, the higher resolution images have a higher resolution due to less binning on the sensor, a lower signal-to-noise ratio, and the same or less motion blur compared to the lower resolution images. A synthesized image with improved image quality (higher resolution, reduced motion blur, and increased signal-to-noise) is then formed by merging together at least portions of the images in the capture set. Motion blur may be reduced in the synthesized image by: (a) offsetting the images in the capture set from one another prior to merging to correct for motion that occurs during acquisition of the capture set; (b) by using the higher resolution image with reduced motion blur to correct for motion blur in the low resolution images; or a combination of (a) and (b).

Within a typical digital camera, both lower resolution images and higher resolution images can typically be captured. The higher resolution images are typically provided at the full resolution of the image sensor while the lower resolution images are provided by binning or decimating the pixels on the sensor. Binning involves connecting neighboring pixels together electronically so that the charges for neighboring pixels are added together, thereby increasing the signal-to-noise ratio and also effectively increasing the size of the pixels while reducing the resolution (reducing the number of pixels) of the sensor. Decimating involves resetting the charge on some of the pixels and consequently, not using the pixel data for those decimated pixels. To increase the signal-to-noise ratio, embodiments of the invention may use binning to produce the lower resolution images in the capture set. In some conditions, such as low light, even the higher resolution images may be binned to increase the signal-to-noise ratio in the images, however, the binning level would be less than that used for the lower resolution images.

Due to the hardware limitations in digital cameras, there are limitations in the processing path opportunities. Fast frame rate captures of multiple images are easier to obtain with lower resolutions images. In addition, high signal-to-noise ratio images are easier to obtain with lower resolution images with longer exposure times. Correcting for motion between multiple images reduces the motion blur that would occur if a single image was captured with an exposure time equal to that of the combined exposure times of the multiple images in the capture set. However, fine edge detail must come from a higher resolution image.

The lower resolution images, in various embodiments of the invention, can be acquired in a highly binned video mode or a preview mode wherein the images are acquired continuously at a rapid rate, such as 30-120 images/sec. In contrast, the higher resolution images can be captured in a full resolution mode or a lower binned mode at a slower rate. In addition, the higher resolution images are acquired with a shorter exposure time than would be typically computed by the autoexposure system for the photographic conditions present in the scene. Typically the acquisition rate of multiple images is limited first by the exposure times, but then by the speed that the image sensor can be readout and the images stored, which is determined by the number of pixels in the image. Consequently, lower resolution images with fewer pixels can be readout and stored much faster than higher resolution images with more pixels. The difference between the number of pixels in a video image and the number of pixels in a full resolution image is often 10× to 20×. Therefore, to reduce the capture time for a multiple image capture set, it is advantageous to use a greater number of lower resolution images and a lesser number of higher resolution images. Therefore, embodiments of the invention pertain to a capture set which includes multiple lower resolution images along with a lesser number (or a single) higher resolution image.

During the acquisition of the images in the capture set, the lower resolution images may be acquired as quickly as possible to reduce the effects of both motion in the scene and the motion of the camera relative to the scene that can occur between images during the acquisition of the capture set. Even though the lower resolution images are acquired quickly, the exposure time for each of the lower resolution images can be the same or longer than the exposure time for a higher resolution image which can result in the same or more motion blur in each lower resolution image. The exposure time can be selected based on both the amount of light present in the scene and the amount of motion detected. Using the same exposure time for both the lower resolution images and the higher resolution images can produce a synthesized image with uniform sharpness while using a longer exposure time for the lower resolution images can produce a synthesized image with the highest signal-to-noise and the lowest chroma noise. The end result is that, the lower resolution images have a higher signal-to-noise ratio due to the same or longer exposure time and effectively bigger pixels from binning, at the expense of being lower resolution and the same or more motion blur. In contrast, the exposure time for the higher resolution image(s) is/are chosen to be shorter than typically used for the imaging conditions to reduce motion blur, while accepting a lower signal-to-noise ratio. The capture set may then be composed of multiple lower resolution images which have a higher signal-to-noise ratio and one or more higher resolution images with a lower signal-to-noise ratio and reduced motion blur.

In addition, embodiments of the invention may include the use of a rolling buffer where the lower resolution images in the capture set can be stored. The benefit of using a rolling buffer is that lower resolution images can be acquired and read continuously into the rolling buffer prior to the acquisition of the higher resolution image(s). In this way, the time to acquire the lower resolution images does not contribute to shutter lag as perceived by the operator. Shutter lag is the delay perceived by the operator between the time when the capture button is fully depressed and the time when the image is actually captured. In practice, when the operator is detected by the camera to be getting ready to capture an image, either by the operator partially depressing the capture button or by the camera detecting the operator placing the camera into a capture position, the lower resolution images begin to be acquired and read into the rolling buffer. When the operator signals the moment for image capture (by fully depressing the capture button) then the capture of the lower resolution images into the rolling buffer is stopped and the higher resolution image is captured. In this way, the perceived shutter lag is only that time required to capture the higher resolution image(s).

Further, the invention discloses that in addition to the lower resolution images being used to produce an image with improved image quality, the lower resolution images can be stored along with the synthesized image to provide context to the synthesized image. This provides a video context to the still image with improved image quality that is produced. To this end, synchronized audio can be captured and stored along with the lower resolution images.

FIG. 1 illustrates a system 100 for forming an image, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110. Although the invention is not so limited, the entire system 100 may be a digital still camera, a digital video camera, or any other digital image acquisition system or device. Alternatively, only portions of the system 100 may reside in such a digital image acquisition device, such as the peripheral system 110, while other portions of the system 100 may reside within a more generic data processing system, such as a computer system.

The data processing system 110 includes one or more data processing devices that implement or facilitate implementation of the processes of the various embodiments of the present invention, including the example processes of FIGS. 2-5 described herein. The phrases "data processing device" or "data processor" are intended to include any data processing device, such as a central processing unit ("CPU") or any other device for processing data, managing data, or handling data, whether implemented with electrical, magnetic, optical, biological components, or otherwise. Such a data processing device may reside within a desktop computer, a laptop computer, a mainframe computer, a personal digital assistant, a Blackberry™, a digital camera, or a cellular phone, for example. It should be noted that, unless otherwise explicitly noted or required by context, the word "or" is used in this disclosure in a non-exclusive sense.

The processor-accessible memory system 140 includes one or more processor-accessible memories configured to store information, including the information needed to execute or facilitate execution of the processes of the various embodiments of the present invention, including the example processes of FIGS. 2-5 described herein. The processor-accessible memory system 140 may be a distributed processor-accessible memory system including multiple processor-accessible memories communicatively connected to the data processing system 110 via a plurality of computers and/or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital images to the data processing system 110. For example, the peripheral system 120 may include digital video cameras, cellular phones, regular digital cameras, or other data processors. The data processing system 110, upon receipt of digital content records from a device in the peripheral system 120, may store such digital content records in the processor-accessible memory system 140.

The user interface system 130 may include a mouse, a keyboard, a touch screen, another computer, or any other device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the processor-accessible memory system 140 even though the user interface system 130 and the processor-accessible memory system 140 are shown separately in FIG. 1.

Figure 2:
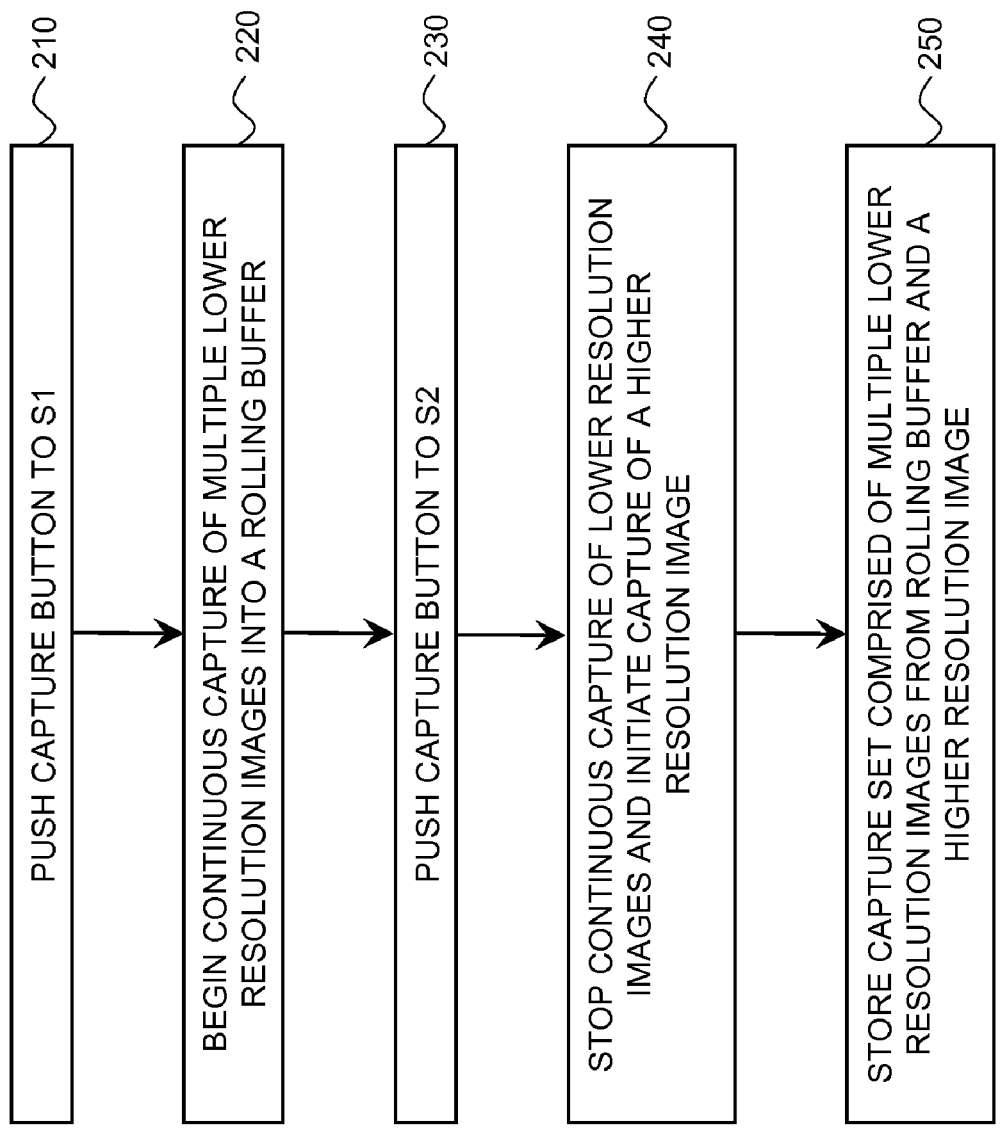
FIG. 2 is a flow diagram of a process of acquiring a set of multiple images, most of which are lower resolution than the others, according to an embodiment of the present invention.

FIG. 2 is a flow diagram of a process of acquiring a set of multiple images, most of which are lower resolution than the others, according to an embodiment of the present invention. In Step 210, the operator begins the acquisition process by pushing the capture button on the camera from the S0 position (undepressed position) to the S1 position (partially depressed position) thereby sending a partially-depressed-capture-button signal to the data processor in the camera, as the operator composes the image. The data processor then instructs the camera to begin acquiring multiple lower resolution images continuously into a rolling buffer on the camera as shown in Step 220. The rolling buffer is capable of storing at least 3 or more lower resolution images. It should be noted that at the same time, the data processor in the camera would also typically complete autofocus and autoexposure. When the moment of acquisition is identified by the operator, the operator pushes the capture button from S1 to S2 (fully depressed position) thereby sending a fully-depressed-capture-button signal to the data processor in the camera, as shown in Step 230. At this point, in Step 240, the data processor instructs the camera to stop continuous acquisition or capture of the low resolution images into the rolling buffer and to initiate the acquisition of a higher resolution image. The data processor then instructs the camera to store the multiple images in the capture set comprised of the multiple lower resolution images and the higher resolution image in Step 250. While the invention is described herein as acquiring only a single higher resolution image in the capture set, it is within the scope of the invention to include more than one higher resolution image in the capture set. It should be noted that as described as an embodiment within the invention, the stored lower resolution images from the rolling buffer preceed the high resolution image in time since they were captured prior to Step 230. However, the invention includes methods wherein the lower resolution images are captured after the higher resolution image as well, such as when the camera is actuated directly from S0 to S2. The multiple images in the capture set are then comprised of the stored higher resolution image and the stored lower resolution images.

An example of a capture set is as follows for a 10 megapixel digital camera. When the operator pushes the capture button from S0 to S1, the data processor instructs the camera to begin acquiring lower resolution video images continuously into a rolling buffer. The video images are 9× binned so that the resolution of each video image is approximately 1 megapixel. The video images are acquired at 30 images/sec. Depending on the light level present in the scene, the video images can be acquired with an exposure time of 1/30 sec each or less. The rolling buffer is large enough to store 10 video images at a time. Once the rolling buffer is full, the oldest video image is deleted prior to a new video image being stored and this process operates continuously until the operator pushes the capture button from S1 to S2. When the capture button is pushed to S2, a single higher resolution image is captured. The higher resolution image can be acquired at full resolution or 10 megapixels. The exposure time for the higher resolution image can be 1/30 sec or less making the exposure time for the lower resolution images substantially the same as the exposure time of the higher resolution image. To reduce motion blur in the higher resolution image the exposure time can be 1/60 sec or less. The capture set is then comprised of the single 10-megapixel image and ten 1-megapixel images, wherein the ten 1-megapixel images preceed the single 10 megapixel image in time. The data processor then instructs the camera to store the multiple images in the capture set.

Figure 3:
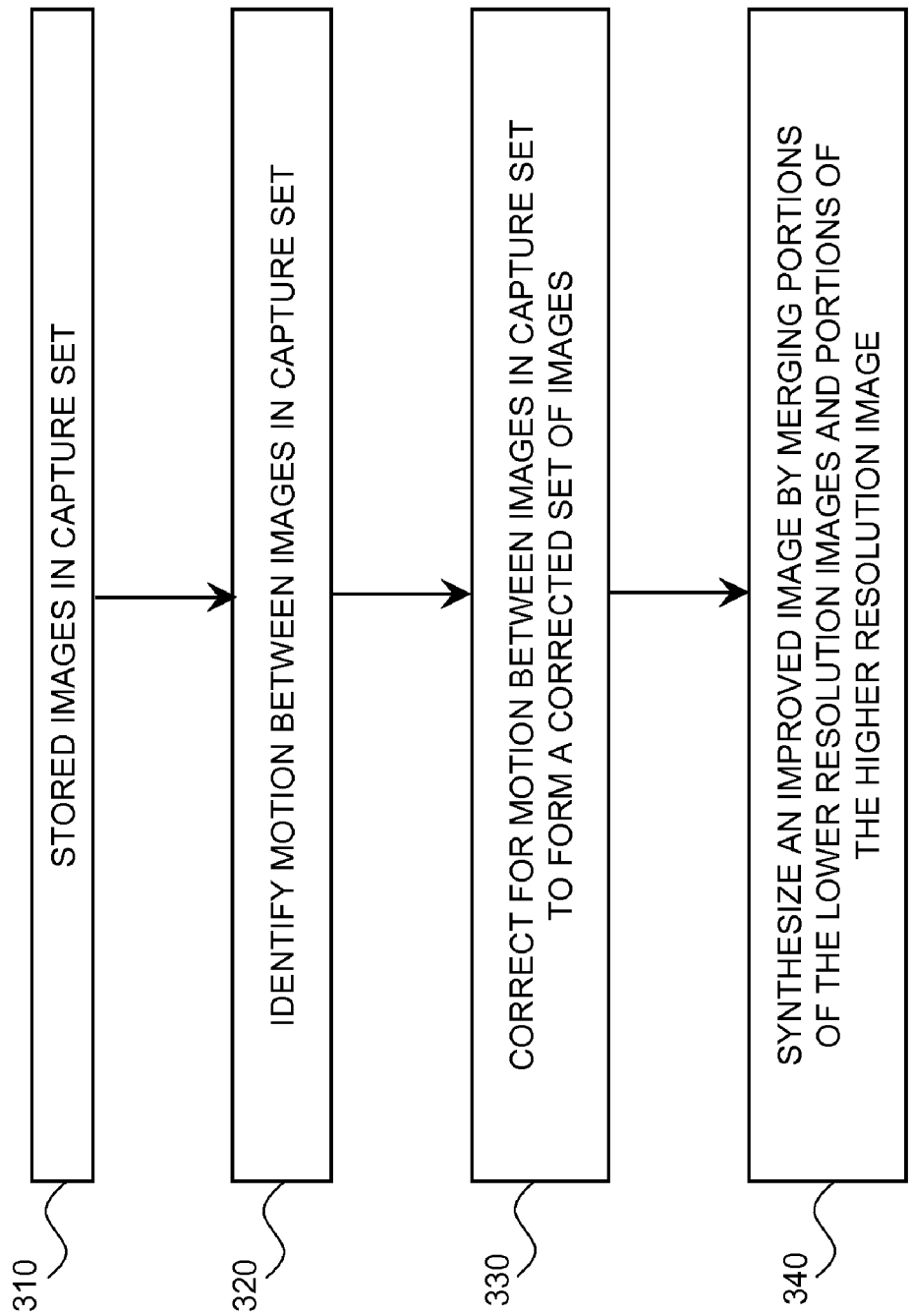
FIG. 3 is a flow diagram of a process for forming an image from the captured set of multiple images, according to an embodiment of the present invention.

FIG. 3 is a flow diagram of a process for forming a single improved image from the captured set of multiple images, according to an embodiment of the present invention and as instructed by the data processor. Step 310 begins with the stored images in the capture set as comprised of multiple images. In Step 320, the multiple images in the capture set are analyzed to identify the motion present between the images. A variety of methods are available for analyzing the images in the capture set to identify motion present between the images. In U.S. patent application Ser. No. 11/130,690 Deever describes a block based method for correlating images to identify motion between images and remove jitter in video sequences. This technique is well suited to images where the motion is relatively uniform between images. In United States Patent Application 2003/0213892 Zhao describes a method for identifying motion between images where the motion between portions of the images is different.

In Step 330, the images are shifted laterally or offset from one another to align common features within the images and correct for the identified motion between images to form a corrected set of images based on instructions from the data processor. In the alignment process, the multiple images are shifted to align with the same single base image. The single base image is preferentially a higher resolution image. An improved image is then synthesized in Step 340 by merging portions of the corrected set of images and portions of the higher resolution image wherein portions of the improved image have at least a higher signal-to-noise ratio or reduced motion blur. The merging may be accomplished by summing the pixel values of the aligned portions of common features within the multiple images in the capture set.

Figure 4:
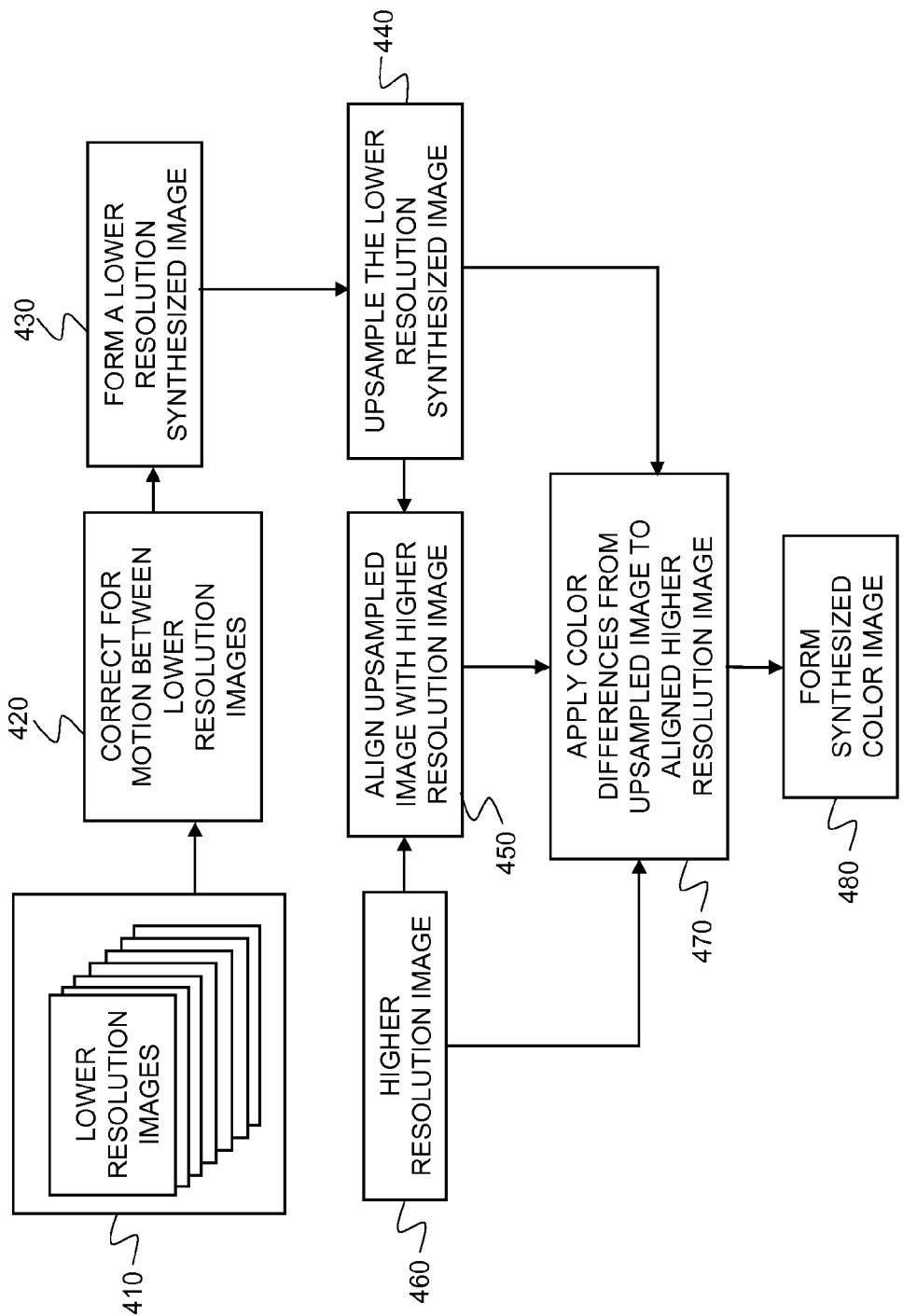
FIG. 4 is a schematic diagram of a process for forming an image from the acquired set of multiple images, according to an embodiment of the present invention.

FIG. 4 is a schematic diagram of a further process for forming an improved single image from the acquired set of multiple images in the capture set, according to an embodiment of the present invention. The multiple lower resolution images are provided for image processing in Step 410. In Step 420 the lower resolution images are corrected for motion between the images. Step 420 includes an analysis of the motion between the lower resolution images. It should also be noted that Step 420 can also include an analysis for motion within the lower resolution images such as is produced by a moving object in the scene. Selection of which lower resolution images to be used in the synthesized image is based upon the motion analysis (both for motion between the lower resolution images and for motion within the lower resolution images), and how well the selected lower resolution images align with one another. In the event that a lower resolution image has too much motion present or if it does not align well, it may not be used to form the synthesized image. In Step 430, the corrected lower resolution images are merged to form a single synthesized lower resolution image. In the merging step, the data processor may instruct the synthesized lower resolution image to be comprised of portions of certain images in the capture set to compensate for moving objects in the scene. The single synthesized lower resolution image is then upsampled in Step 440 to increase the number of pixels in the lower resolution images to the same number of pixels as the higher resolution image. The interpolation method used for forming the upsampled image can be bicubic or any other as well known to those skilled in the art. The higher resolution image is provided for image processing in Step 460. The upsampled image is aligned with the higher resolution image in Step 450. Step 450 may include blurring of the luma or green channel of the higher resolution image in order to modulate the edge detail to be more comparable to the upsampled image. The alignment process in Step 450 produces an alignment map for applying the color from the upsampled image to the higher resolution image. In Step 470, color difference images are generated from both the higher resolution image (Step 460) and the upsampled image (Step 440) and then combined with the alignment map from Step 450 to form a synthesized color difference. The application of color differences for a given pixel may be an averaging that is 80% from the upsampled image pixel value and 20% from the high resolution image pixel value, or some other weighted combination of the upsampled image pixel values and the high resolution pixel values. The color difference image is then converted to a synthesized color image in Step 480, wherein the synthesized color image is comprised of portions of the upsampled image and portions of the higher resolution image.

Figure 5:
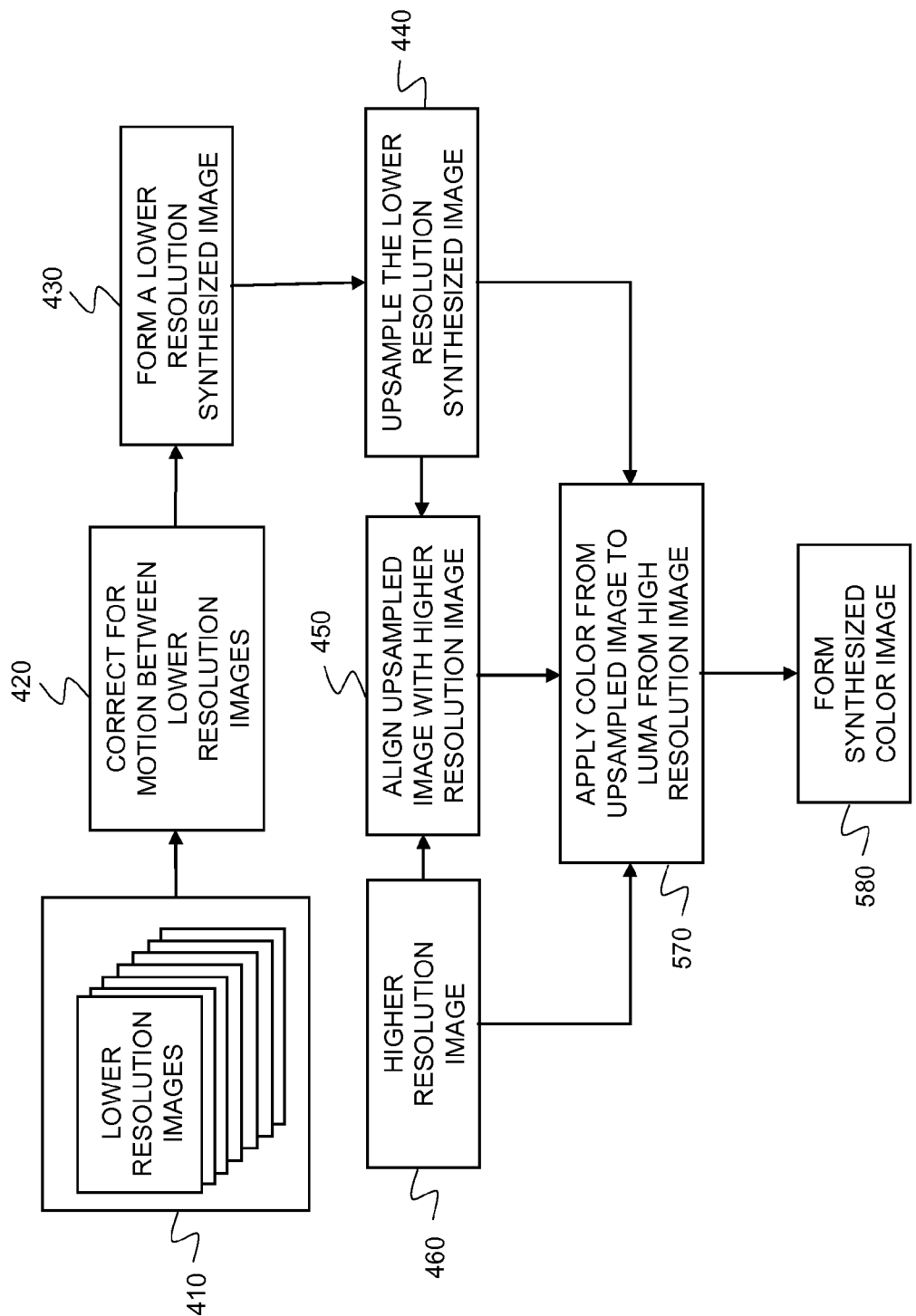
FIG. 5 is a schematic diagram of another process for forming an image from the acquired set of multiple images, according to another embodiment of the present invention.

FIG. 5 is a schematic diagram of a yet further process for forming an improved single image from the acquired set of multiple images in the capture set, according to another embodiment of the present invention. Similar to the method shown in FIG. 4, the lower resolution images presented in Step 410 are corrected for motion between images in Step 420 and used to form a lower resolution synthesized image in Step 430 which is upsampled to match the higher resolution image in Step 440. The upsampled image is then aligned in Step 450 with the higher resolution image as presented in Step 460. However, in Step 570, the color or chroma portion of the upsampled image is merged with the black & white or luma portion of the higher resolution image to form a synthesized color image in Step 580 which has improved image quality.

It should be noted that video images are often captured with a different aspect ratio than still images. If the lower resolution images in the capture set are acquired through the video imaging path, the synthesized image produced from the multiple image capture set may be limited to the aspect ratio of the video images. Alternately, the lower resolution images may be acquired with the aspect ratio of the higher resolution image and a higher degree of binning so that the synthesized image will be the aspect ratio of the higher resolution image.

Figure 6:
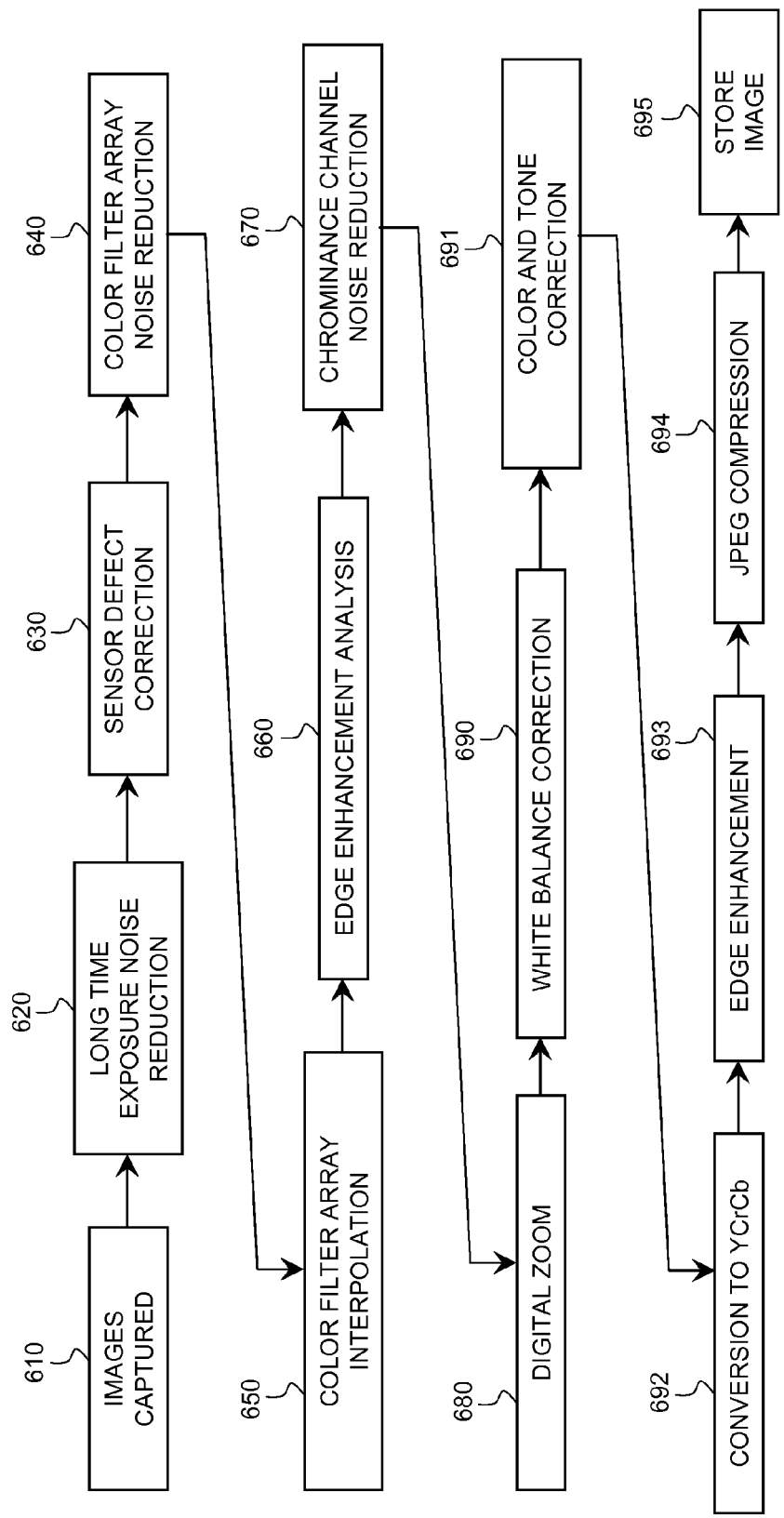
FIG. 6 illustrates an image processing workflow in which processes, such as those shown in FIGS. 3, 4 and 5, may be inserted at various points, according to various embodiments of the present invention.

FIG. 6 illustrates an image processing workflow as instructed by the data processor, in which processes, such as those shown in FIGS. 3, 4 and 5, may be inserted at various points, according to various embodiments of the present invention. Step 610 is the image acquisition step, wherein the multiple images in the capture set are acquired and stored as shown in FIG. 2. Step 620 corrects for dark current type noise from the sensor. Step 630 corrects for defects on the sensor including bad pixels and bad columns. Step 640 is a noise reduction step based on the pixel data that includes the influence of the color filter array. Step 650 interpolates the pixel data to derive complete color information for every pixel. Step 660 analyzes the interpolated pixel data to identify edges within the image. Step 670 is a noise reduction step based on the interpolated pixel data that includes only the chrominance channel. Step 680 is where any digital zoom is applied to define the portion of the image that will be fully processed. Step 690 is a correction for the general lighting in the scene. Step 691 is a color correction step. Step 692 is a conversion of the image from red/green/blue to YCrCb (wherein Y is the brightness (luma), Cb is blue minus luma (B−Y) and Cr is red minus luma (R−Y)). In step 693, the edges of objects in the image are enhanced. In Step 694, the image is compressed to a JPEG file or other compressed file format. In Step 695, the processed image is stored. Based on this image processing chain, the processing of the multiple images in the capture set as shown in FIGS. 3, 4 and 5 could be performed before any noise reduction to reduce the number of images that have to be image processed as in between Steps 610 and 620. Another option is to process the multiple images in the capture set after the sensor related noise has been removed from each of the multiple images in the capture set as in between Steps 640 and 650. An alternate option would be to perform the image processing of the multiple images in the capture set after the multiple images have had the edges identified to aid in correcting for motion as in between Steps 660 and 670. A further option is to perform the image processing of the multiple images in the capture set after the further chrominance channel noise cleaning when more of the noise has been removed in each of the images in the capture set as in between Steps 670 and 680. Another option for where to perform the image processing of the multiple images in the capture set is after the images in the capture set have been fully color corrected and edge enhanced as in between Steps 693 and 694. All of the cases listed above for where to do the image processing of the multiple images in the capture set will result in a final image that has similar improved image quality, the differences between the different options will be in the level of computational power required and the size of the computational memory required to store the multiple images during image processing.

According to some embodiments of the present invention, multiple noise cleaning operations may be provided in the processing path to further improve the signal-to-noise ratio. There is a spatial noise cleaning because most of the images in the capture set are lower resolution images with binned pixels. There is a temporal noise cleaning because multiple lower resolution images are corrected for motion between images and then summed together to produce a lower resolution synthesized image. There is an upsampling noise cleaning for the lower resolution synthesized image because the upsampling process from lower to higher resolution does not introduce high frequency noise. There is another temporal noise cleaning when the upsampled image is aligned to the higher resolution image. There is another spatial noise cleaning when the lower resolution color difference is applied to the higher resolution color difference image. It is anticipated that other noise cleaning steps may be applied to the various images that are created throughout the image processing.

The synthesized color image produced can be characterized as approaching the following qualities: a high signal-to-noise similar to the lower resolution images; a reduced motion blur similar to the higher resolution image; a resolution similar to the higher resolution image; and a shutter lag similar to capturing a single higher resolution image.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST

100 System for forming an image
110 Data processing system

120 Peripheral system
130 User interface system
140 Processor-accessible memory system
210 Step
220 Step
230 Step
240 Step
250 Step
310 Step
320 Step
330 Step
340 Step
410 Step
420 Step
430 Step
440 Step
450 Step
460 Step
470 Step
480 Step
570 Step
580 Step
610 Step
620 Step
630 Step
640 Step
650 Step
660 Step
670 Step
680 Step
690 Step
691 Step
692 Step
693 Step
694 Step
695 Step

The invention claimed is:

1. A method implemented at least in part by a data processing system, the method for forming an image with reduced motion blur and increased signal to noise ratio, and the method comprising the steps of:
acquiring one or more high resolution images and two or more lower resolution images of a scene over a contemporaneous period of time, wherein the acquired high resolution images are acquired using an image acquisition mode that results in images that have motion blur less than the lower resolution images and wherein the lower resolution images are acquired using a different image acquisition mode that results in images that have lower resolution and higher signal to noise ratio than the high resolution images;
forming a corrected set of images at least by using common features in the low and high resolution images to align some of the lower resolution images to correct for motion present between the lower resolution images and the higher resolution image;
forming a synthesized high resolution image with reduced motion blur and higher signal to noise ratio at least by merging (a) a portion of one of the images in the corrected set of images, and (b) a portion of a high resolution image; and
storing of the synthesized image in a processor-accessible memory system.

2. The method of claim 1, wherein the step of forming a corrected set of images further comprises merging of the two or more lower resolution images that were motion-corrected into a single lower-resolution image, wherein the corrected set of images comprises only the single lower-resolution image.

3. The method of claim 1, wherein only a single higher resolution image is acquired.

4. The method of claim 1, wherein the step of acquiring further comprises acquiring of the lower resolution images prior to acquisition of the one or more higher resolution images.

5. The method of claim 4, wherein the step of acquiring further comprises saving the lower resolution images in a rolling buffer.

6. The method of claim 4, further comprising a step of receiving a partially-depressed-capture-button signal, which causes the acquisition of the lower resolution images, wherein the method further comprises a step of receiving a fully-depressed-capture-button signal after receiving the partially-depressed-capture-button signal, and wherein receipt of the fully-depressed-capture-button signal causes the acquisition of the one or more high resolution images.

7. The method of claim 1, wherein at least some of the lower resolution images are video images or preview images.

8. The method of claim 6,
wherein the lower resolution images are video images,
wherein the step of acquiring further comprises acquiring of audio data while acquiring the lower resolution images, and
wherein the method further comprises the step of storing of the audio data and the lower resolution images in the processor-accessible memory system in a manner that links the audio data and the lower resolution images to the synthesized image.

9. The method of claim 1, wherein the different image acquisition mode captures lower resolution images that have substantially the same exposure time as the high resolution images.

10. The method of claim 1, wherein the different image acquisition mode captures lower resolution images that have longer exposure times than the high resolution images.

11. The method of claim 1, wherein the step of forming the corrected set of images, the step of forming the synthesized image, and the step of storing of the synthesized image occur prior to noise-reduction-processing performed on any of the multiple images.

12. The method of claim 1, wherein the step of forming the corrected set of images, the step of forming the synthesized image, and the step of storing of the synthesized image occur after image-sensor-related-noise has been removed from each of the acquired images.

13. The method of claim 1, wherein the step of forming the corrected set of images, the step of forming the synthesized image, and the step of storing of the synthesized image occur after edges have been identified in each of the acquired images.

14. The method of claim 1, wherein the step of forming the corrected set of images, the step of forming the synthesized image, and the step of storing of the synthesized image occur after the acquired images have been fully color corrected and edge enhanced.

15. The method of claim 1, wherein the different image acquisition mode increases the signal to noise ratio of the lower resolution images by increasing their exposure time.

16. A method implemented at least in part by a data processing system, the method for forming an image with reduced motion blur and increased signal to noise ratio, and the method comprising the steps of:

acquiring one or more high resolution images and two or more lower resolution images of a scene over a contemporaneous period of time, wherein the high resolution images are acquired using an image acquisition mode that results in images that have motion blur less than the lower resolution images and wherein the lower resolution images are acquired using a different image acquisition mode that uses binning to result in images that have lower resolution and higher signal to noise ratio than the high resolution images;

forming a corrected set of images at least by using common features in the low and high resolution images to align some of the lower resolution images to correct for motion present between the lower resolution images and the higher resolution image;

forming a synthesized high resolution image with reduced motion blur and higher signal to noise ratio at least by merging (a) a portion of one of the images in the corrected set of images, and (b) a portion of a high resolution image; and storing of the synthesized image in a processor-accessible memory system.

17. The method of claim 16, wherein the step of forming a corrected set of images further comprises merging of the two or more lower resolution images that were motion-corrected into a single lower-resolution image, wherein the corrected set of images comprises only the single lower-resolution image.

18. The method of claim 16, wherein the step of acquiring further comprises saving the lower resolution images in a rolling buffer.

19. The method of claim 16, wherein the lower resolution images have substantially the same exposure time as the high resolution images.

20. The method of claim 16, wherein the lower resolution images have longer exposure times than the high resolution images.

21. The method of claim 16, wherein the signal to noise ratio of the lower resolution images is further increased by increasing their exposure time.

* * * * *